United States Patent [19]
Louckes et al.

[11] 3,732,752
[45] May 15, 1973

[54] LOCKING TYPE DIFFERENTIAL GEAR MECHANISM

[75] Inventors: Theodore N. Louckes, Lansing; Ronald H. Haas, Okemos; Morris J. Duer, Lansing, all of Mich.

[73] Assignee: General Motors Corporation, Detroit, Mich.

[22] Filed: July 26, 1971

[21] Appl. No.: 165,981

[52] U.S. Cl. ................................... 74/710.5
[51] Int. Cl. .................................. F16h 1/44
[58] Field of Search ........................ 74/710.5

[56] References Cited

UNITED STATES PATENTS

| | | |
|---|---|---|
| 3,306,130 | 2/1967 | Salzmann ................... 74/710.5 |
| 3,400,610 | 9/1968 | Taylor et al. ................ 74/710.5 |
| 3,439,785 | 4/1969 | Hughson ..................... 74/710.5 |
| 3,439,786 | 4/1969 | Schmid ....................... 74/710.5 |
| 3,460,404 | 8/1969 | Schmid ....................... 74/710.5 |
| 3,605,965 | 9/1971 | Thomas et al. ............. 74/710.5 |

*Primary Examiner*—C. J. Husar
*Attorney*—J. L. Carpenter et al.

[57] ABSTRACT

A differential gear mechanism having a locking arrangement for selectively locking the mechanism's rotary case and one side gear including locking pins that are carried by the case and are normally biased to an unlocked position and a solenoid that operates through linkage to bias the locking pins to a lock position lockingly engaging the case to the one side gear with such linkage yielding when the locking pins are not aligned for such engagement to maintain the biasing force to effect engagement on alignment.

5 Claims, 6 Drawing Figures

INVENTORS
Theodore N. Louckes,
Ronald H. Haas, &
BY Morris J. Ouer

Ronald L. Phillips
ATTORNEY

INVENTORS
Theodore N. Louckes,
Ronald H. Haas, &
BY Morris J. Duer

Ronald L. Phillips
ATTORNEY

LOCKING TYPE DIFFERENTIAL GEAR MECHANISM

This invention relates to locking type differential gear mechanisms and more particularly to manually controlled locking type differential gear mechanisms.

In attempting to provide a simple and reliable manually controlled locking type automotive vehicle differential gear mechanism, it has been found that the actuator for effecting the locking operation presents a cost factor that is largely dependent on its duty cycle which thus far has been considerable. Since the cost increases with increasing duty, it is therefore desirable that such duty be minimized without complicating the other actuator mechanism structure.

A differential gear mechanism incorporating a manually controlled locking mechanism according to the present invention comprises a drive pinion meshing with a ring gear that is fixed to rotate with a case. The case rotatably supports pinion gears that mesh with side gears that are connected to axle shafts. The manually controlled locking mechanism for this differential comprises a plurality of pins that are supported by the case for movement between a lock position and an unlock position. One of the side gears has a plurality of apertures for receiving these locking pins on alignment therewith and movement of the pins to the lock position. Springs are provided for normally biasing the locking pins to the unlock position and an actuator ring that is secured to the pins and thus rotates with the case is urged by operation of a manually controlled solenoid through a flexible lever arrangement to bias the locking pins to the lock position. The lever is operable to flex while exerting lock engaging force on the actuator ring when the locking pins are not aligned with the apertures so when alignment does occur, locking is then quickly effected. This permits the solenoid to be designed for intermittent duty wherein it accepts a strong surge of current for a short duration for arming the lever arrangement for lock engagement and then drops to a much lower current flow for the holding operation.

An object of the present invention is to provide a new and improved manually controlled locking type automotive vehicle differential gear mechanism.

Another object is to provide a manually controlled locking type automotive vehicle differential gear mechanism with locking action effected by an actuator operating through yieldable linkage that minimizes actuator duty.

Another object is to provide a manually controlled locking type automotive vehicle differential gear mechanism having a locking device including a solenoid that operates through yieldable linkage to effect locking of the gear mechanism with the linkage yielding to maintain a lock engaging force until the lock is aligned for locking.

These and other objects of the present invention will be more apparent from the following description and drawing in which.

Figure 4:
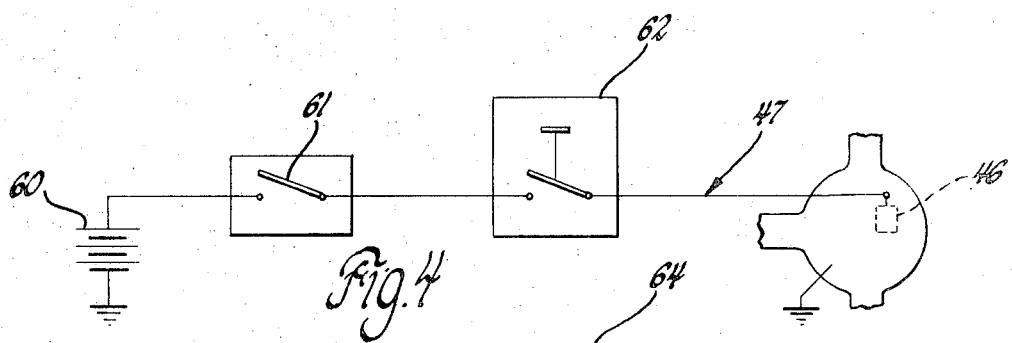
Figure 5:
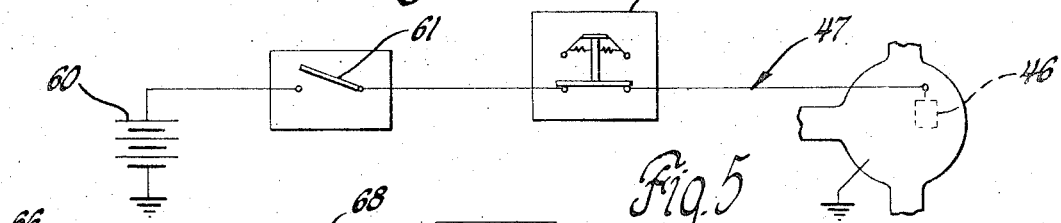
Figure 6:
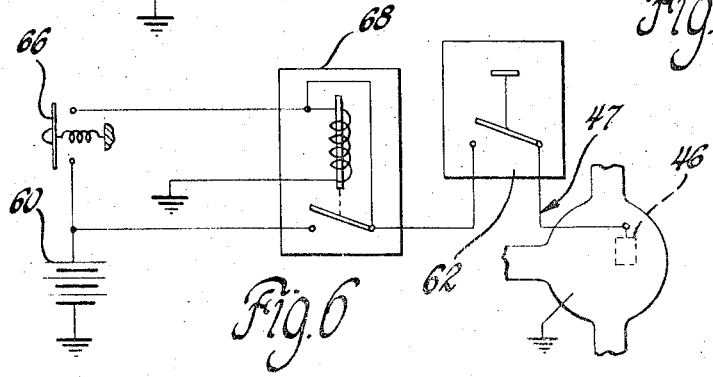

FIGS. 4, 5 and 6 diagrammatically illustrate three different control circuits for the locking mechanism.

Figure 1:
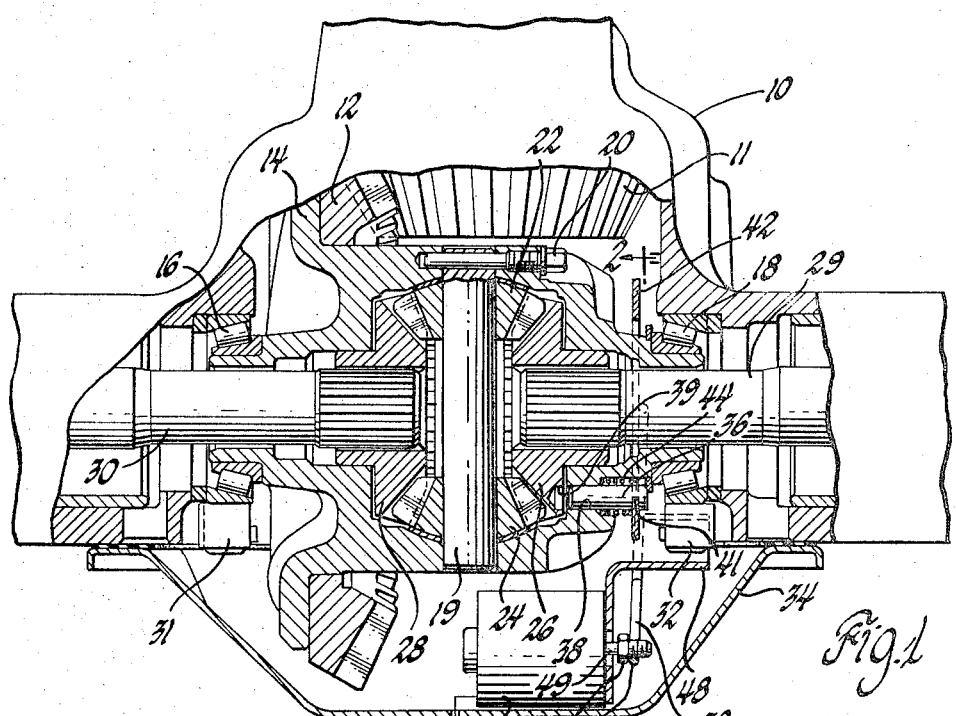
FIG. 1 is a plan view partly broken away and in section of an automotive vehicle differential gear mechanism incorporating a locking mechanism according to the present invention.
Figure 2:
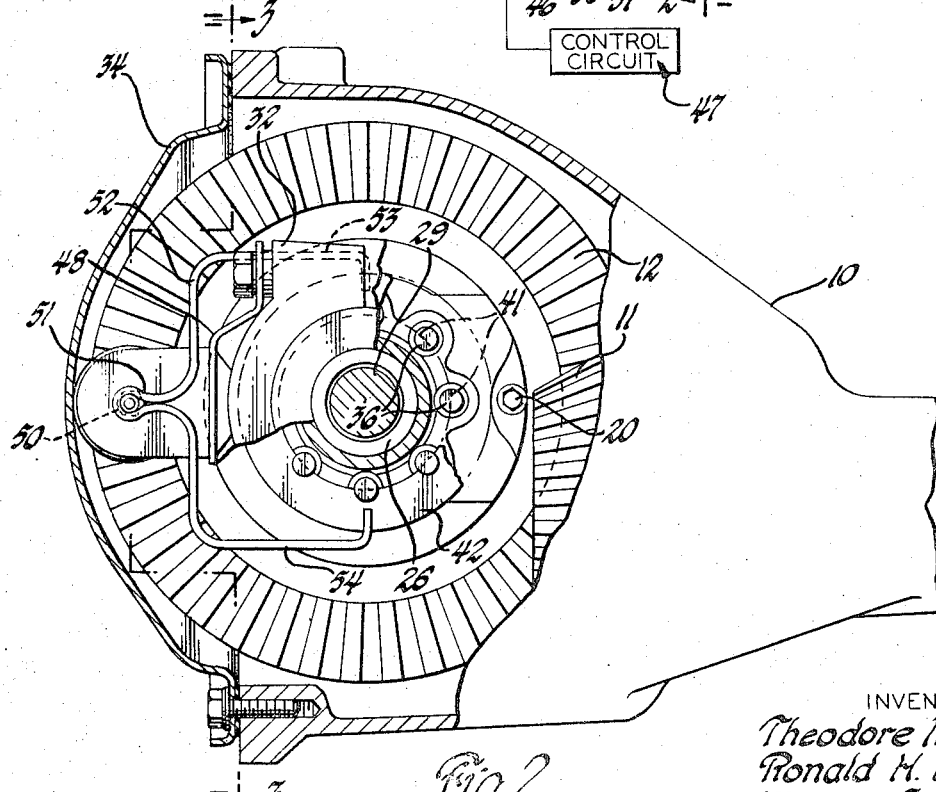
FIG. 2 is a view taken on the line 2—2 in FIG. 1.
Figure 3:
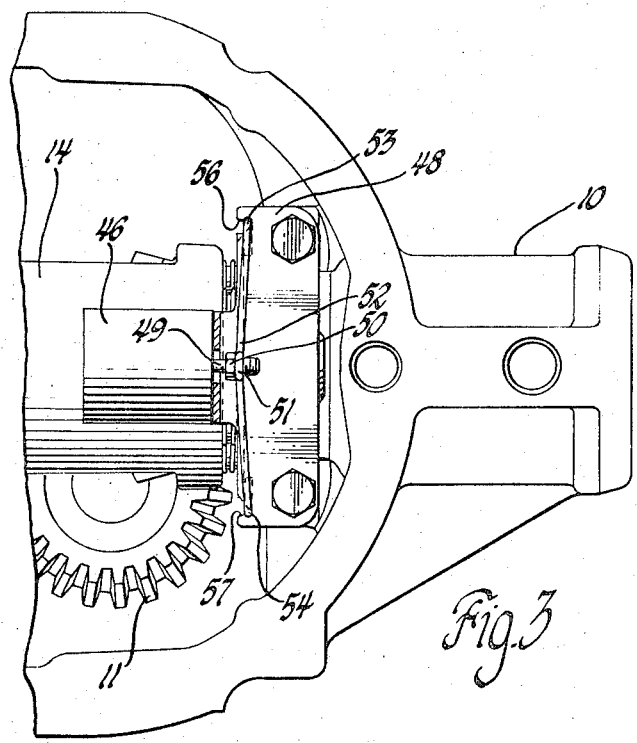
FIG. 3 is a view taken on the line 3—3 in FIG. 2.

Referring to FIGS. 1 – 3 there is shown an automotive vehicle differential gear mechanism comprising a housing 10 in which is rotatably supported a drive pinion 11, such support being by a pair of spaced drive pinion bearings, not shown. The drive pinion 11 is beveled and meshes with a ring gear 12 which is also beveled and has its axis at right angles to the axis of drive pinion 11. The ring gear 12 is bolted to a rotary differential case 14 that is rotatably supported at its outboard ends or hubs in the housing 10 by a pair of side bearings 16 and 18. A pinion gear shaft 19 is arranged at right angles to the axis of the case 14 and is secured to the case by a locking bolt 20. The pinion gear shaft 19 rotatably supports within the case 14 a pair of beveled pinion gears 22 and 24 which each mesh at opposite sides with a pair of beveled side gears 26 and 28. The side gears 26 and 28 are splined to the inboard ends of a pair of axle shafts 29 and 30, respectively, that project through the case's hubs. The two side bearings 16 and 18 are retained by bearing caps 31 and 32 that are bolted to the housing 10. The access through the open rear side of this housing to these caps and the other parts is closed by a cover 34 that is bolted to the rear side of the housing. The differential gear mechanism thus far described is of a conventional type operatively connecting its input to its two outputs while dividing the input force between them and permitting one output to rotate faster than the other for vehicle turning.

According to the present invention, the differential gear mechanism is provided with a manually controlled locking mechanism comprising a plurality of locking pins 36 that are located in circumferentially spaced axial bores 38 in the righthand side of the rotary case 14. The pins 36 are thus carried by the case and are reciprocal therein to be movable into holes 39 in the outboard side of the right-hand side gear 26 which holes are alignable with bores 38. When the locking pins 36 are received in the holes 39, the rotary case 14 and the side gear 26 are locked together and thus the differential gear mechanism is locked against differential action to prevent relative rotation between the axle shafts. As best shown in FIGS. 1 and 2, each of the pins 36 is provided with a slot 41 in the area where the pins project from the case 14. The slots 41 are arranged to receive the inner radius portion of an actuator ring 42 that is arranged concentric with the right-hand hub portion of the case 14 with the result that the ring 42 thus rotates with the case 14 by its support on the pins and about the case's axis. A coil spring 44 is arranged about each pin 36 in a counterbore portion of each bore 39 and between the case 14 and the ring 42 to bias the actuator ring 42 and thus the pins 36 rightward as viewed in FIGS. 1 and 3 toward an unlock position in which the pins 36 are disengaged from the holes 39. Leftward movement of the ring 42 toward a lock position to effect movement of the pins 36 into the holes 39 is provided by yieldable linkage that is operated by a solenoid 46. Solenoid 46 is controlled by a manually controlled circuit 47 whose details will be described in detail later. Solenoid 46 is mounted on a bracket 48 that is bolted together with the right-hand side bearing cap 32 to the housing 10 in a position that is diametrically opposite the drive pinion 11 and adjacent the inside of the differential housing cover 34. The solenoid 46 is of the push type having an output plunger 49 that is normally spring biased leftward to the position shown in FIG. 1 when deenergized. A collar 50 is threadably secured to the solenoid output 49 so as to be axially adjustable relative thereto and engages a loop portion 51 of a forked lever 52. Referring to FIGS. 2 and 3, the lever 52 which is made of spring wire or rod has two arms 53 and 54 which have straight portions that are received at intermediate points in notches 56 and 57, respectively, of the solenoid bracket 48, these notches being located on the solenoid or rear side of the case axis as shown in FIG. 1. The loop portion 51 of the lever 52 thus constitutes one end of the lever 52 and on the other side of the fulcrums there are the ends of the lever arms 53 and 54 which are bent radially inward to intersect the case's axis. The ends of lever arms 53 and 54 project sufficiently radially inward to engage the actuator ring 42 at diametrically opposite points. When the solenoid 46 is deenergized there is some prestress in the spring lever 52 with the one end engaging the solenoid output collar 50 and the other lever ends contacting actuator ring 42 which latter contact is a sliding contact when the case 14 is rotating.

When it is desired to lock up the differential gear mechanism, the solenoid 46 is energized with the result that the output plunger 49 takes a full or normal stroke to the right as viewed in FIG. 1. If the pins 36 are in alignment with the holes 39, the solenoid output pivots the lever 52 to move the actuator ring 42 and thus the locking pins 36 from the unlock position to the lock position to accomplish locking. On the other hand, if at the time of initial solenoid operation the locking pins 36 are not aligned with the holes 39, the solenoid output 49 nevertheless takes a full stroke but then the lever 52 deflects primarily in the arms 53 and 54 while the actuator ring 42 is prevented from locking movement by the unaligned pins and holes and is thus armed with a lock engaging force to quickly engage the pins 36 in the holes 39 when there is sufficient relative rotation between the case 14 and side gear 26 caused by wheel spin or slip to bring the locking pins and holes into alignment. Thus, it will be appreciated that the lever 52 by being made flexible and yielding when there is not alignment for locking permits the solenoid 46 to be designed for intermittent duty where it can accept a strong surge of current for arming the spring lever and then drop to a much lower current flow for holding the lock condition.

The control circuit 47 for the solenoid 46 operates to limit differential lock to low vehicle speeds and may take several forms as diagrammatically illustrated in FIGS. 4, 5, and 6. In the FIG. 4 circuit an electrical power source 60 which may be provided by the vehicle's battery is connected to the solenoid 46 by a manual switch 61 controlled by the vehicle operator and a speed indicating switch 62 in series therewith. The switch 62 may already exist in the vehicle such as in systems of the type disclosed in copending U.S. Pat. application Ser. No. 41,888 filed June 1, 1970, entitled "Ignition Timing Control" by Robert S. Tooker and James J. Dawson and assigned to the assignee of this invention. In the Tooker et al. application, the switch 62 is closed in a low speed transmission drive and open in a high speed transmission drive and thus for the differential gear mechanism operation, locking can be effected only in such low speed transmission drive. In the FIG. 5 circuit there is illustrated another type of control for limiting operation of the differential lock to low vehicle speeds with there again being a manually controlled switch 61 but instead of a transmission drive controlled switch there is provided a centrifugal speed switch 64 which is connected so that its operator responds to vehicle speed. The switch 64 is calibrated to open the circuit to the solenoid 46 above a predetermined speed so that locking operation is thus limited to lower speeds.

The FIG. 6 circuit provides for manual selection of differential lock with such locking then being held until a predetermined vehicle speed is reached. In the FIG. 6 circuit, a manually controlled push button switch 66 is connected in series with a latching relay 68 and a switch 62 like that in the FIG. 4 circuit to effect connection of the battery 60 to the solenoid 46. Thus the operator can select lock operation and this condition will be maintained until high speed transmission drive occurs.

The above described embodiment with the several control circuits is illustrative of the invention which may be modified within the scope of the appended claims.

We claim:

1. A differential gear mechanism comprising a housing, a drive pinion rotatably supported in said housing, a rotary case rotatably supported in said housing, a ring gear fixed to rotate with said case and meshing with said drive pinion, a pair of side gears rotatably supported by said case, a differential gear rotatably supported by said case and meshing with both said side gears, lock engaging means supported by said case for movement between a lock position and an unlock position, one of said side gears having lock engaged means engaged by said lock engaging means on alignment therewith and movement of said lock engaging means to said lock position to lock said case to said one side gear, means for normally biasing said lock engaging means to said unlock position, an actuator ring coaxial with said case and secured to said lock means to rotate with said case, resilient lever means supported for pivotal movement in said housing and arranged to engage said actuator ring to bias said lock engaging means towards said lock position on pivotal movement in a locking direction and actuator means supported in said housing having an output that engages said lever means and is movable to pivot said lever means in said locking direction to effect engagement of said lock engaging means with said lock engaged means with said lever means flexing while exerting lock engaging force on said actuator ring when said lock engaging means is not aligned with said lock engaged means so that when alignment does occur locking is then effected.

2. A differential gear mechanism comprising a housing, a drive pinion rotatably supported in said housing, a rotary case rotatably supported in said housing, a ring gear fixed to rotate with said case and meshing with said drive pinion, a pair of said gears rotatably supported by said case, a differential gear rotatably supported by said case and meshing with both said side gears, lock engaging means supported by said case for movement between a lock position and an unlock position, one of said side gears having lock engaged means engaged by said lock engaging means on alignment therewith and movement of said lock engaging means to said lock position to lock said case to said one side gear, means for normally biasing said lock engaging means to said unlock position, an actuator ring coaxial with said case and secured to said lock means to rotate with said case, resilient lever means supported for pivotal movement in said housing and arranged to engage said actuator ring to bias said lock engaging means towards said lock position on pivotal movement in a locking direction and a solenoid supported in said housing having an output that engages said lever means and is movable to pivot said lever means in said locking direction to effect engagement of said lock engaging means with said lock engaged means with said lever means flexing while exerting lock engaging force on said actuator ring when said lock engaging means is not aligned with said lock engaged means so that when alignment does occur locking is then effected.

3. A differential gear mechanism comprising a housing, a drive pinion rotatably supported in said housing, a rotary case rotatably supported in said housing, a ring gear fixed to rotate with said case and meshing with said drive pinion, a pair of side gears rotatably supported by said case, a differential gear rotatably supported by said case and meshing with both said side gears, a plurality of lock pins supported by said case for movement between a lock position and an unlock position, one of said side gears having a plurality of apertures for receiving said lock pins on alignment therewith and movement of said pins to said lock position to lock said case to said one side gear, means for normally biasing said lock pins to said unlock position, an actuator ring coaxial with said case and secured to said lock pins to rotate with said case, resilient lever means supported for pivotal movement in said housing and arranged to engage said actuator ring to bias said lock pins toward said lock position on pivotal movement in a locking direction and a solenoid supported in said housing having an output that engages said lever means and is movable to pivot said lever means in said locking direction to effect movement of said lock pins into said apertures with said lever means flexing while exerting lock engaging force on said actuator ring when said lock pins are not aligned with said apertures so that when alignment does occur locking is then effected.

4. A differential gear mechanism comprising a housing, a drive pinion rotatably supported in said housing, a rotary case rotatably supported in said housing, a ring gear fixed to rotate with said case and meshing with said drive pinion, a pair of side gears rotatably supported by said case, a differential gear rotatably supported by said case, a differential gear rotatably supported by said case and meshing with both said side gears, lock engaging means supported by said case for movement between a lock position and an unlock position, one of said side gears having lock engaged means engaged by said lock engaging means on alignment therewith and movement of said lock engaging means to said lock position to lock said case to said one side gear, means for normally biasing said lock engaging means to said unlock position, an actuator ring coaxial with said case and secured to said lock means to rotate with said case, resilient lever means supported for pivotal movement in said housing and arranged to engage said actuator ring to bias said lock engaging means towards said locking position on pivotal movement in a locking direction, a solenoid supported in said housing having an output that engages said lever means and on solenoid operation moves to pivot said lever means in said locking direction to effect engagement of said lock engaging means with said lock engaged means with said lever means flexing while exerting lock engaging force on said actuator ring when said lock engaging means is not aligned with said lock engaged means so that when alignment does occur locking is then effected and a control circuit for controlling said solenoid comprising a power source, a manually operated switch for connecting said power source to said solenoid and switch means in series with said manual switch for controlling energization of said solenoid according to usage speed.

5. A differential gear mechanism comprising a housing, a drive pinion rotatably supported in said housing, a rotary case rotatably supported in said housing, a ring gear fixed to rotate with said case and meshing with said drive pinion, a pair of side gears rotatably supported by said case, a differential gear rotatably supported by said case and meshing with both said side gears, lock engaging means supported by said case for movement between a lock position and an unlock position, one of said side gears having lock engaged means engaged by said lock engaging means on alignment therewith and movement of said lock engaging means to said lock position to lock said case to said one side gear, means for normally biasing said lock engaging means to said unlock position, an actuator ring coaxial with said case and secured to said lock means to rotate with said case, resilient lever means supported for pivotal movement in said housing and arranged to engage said actuator ring to bias said lock engaging means towards said lock position on pivotal movement in a locking direction, a solenoid supported in said housing having an output that engages said lever means and on solenoid operation moves to pivot said lever means in said locking direction to effect engagement of said lock engaging means with said lock engaged means with said lever means flexing while exerting lock engaging force on said actuator ring when said lock engaging means is not aligned with said lock engaged means so that when alignment does occur locking is then effected and a control circuit for controlling said solenoid comprising a power source and a manually operated momentarily closable switch in series with a latching relay and usage speed indicating switch means for controlling energization of said solenoid with energization maintained according to usage speed.

* * * * *